United States Patent [19]

Vikiö

[11] Patent Number: 4,549,964

[45] Date of Patent: Oct. 29, 1985

[54] DEVICE FOR FLUSHING OBSTRUCTIONS FROM THE REJECT HEAD OF A CENTRIFUGAL SEPARATOR

[75] Inventor: Pentti Vikiö, Savonlinna, Finland

[73] Assignee: Enso-Gutzeit Oy, Helsinke, Finland

[21] Appl. No.: 500,207

[22] Filed: Jun. 2, 1983

[30] Foreign Application Priority Data

Jun. 3, 1982 [FI] Finland ................................ 821971

[51] Int. Cl.4 ............................................ B01D 35/16

[52] U.S. Cl. .................................................. 210/369

[58] Field of Search ............... 210/369, 390, 392, 376, 210/372, 238, 512.1; 134/8, 12, 104; 138/89; 220/284

[56] References Cited

U.S. PATENT DOCUMENTS 2,392,656 1/1946 Foster ................................ 210/238
3,131,145 4/1964 Rosaen ................................ 210/392
3,207,356 9/1965 Pentesco ............................ 220/284
3,294,317 12/1966 Moretti .............................. 210/369

FOREIGN PATENT DOCUMENTS 53998 6/1934 Finland .
1355916 6/1974 United Kingdom .

*Primary Examiner*—Barry S. Richman
*Assistant Examiner*—John Donofrio
*Attorney, Agent, or Firm*—Toren, McGeady, Stanger, Goldberg & Kiel

[57] ABSTRACT

A device for cleaning obstructions from the reject end of a centrifugal separator without interrupting normal opertion. Modern small-sized separators, in particular, are liable to become blocked, and the usual method of removing the blockage is to use a water jet or pressurized air which is led to the obstructed reject end by various methods. The disadvantage associated with these methods is that the impurities removed by the jet partially contaminate the regular flow. This invention will help to avoid this because cleaning is effected by means of a device having a chamber into which the flow containing the rejected material is directed when the plug of the separator is opened. The chamber is fitted with a discharge orifice. In this way, the reversed flow removes the obstruction in the reject orifice, thus preventing it from contaminating the accept mass.

3 Claims, 3 Drawing Figures

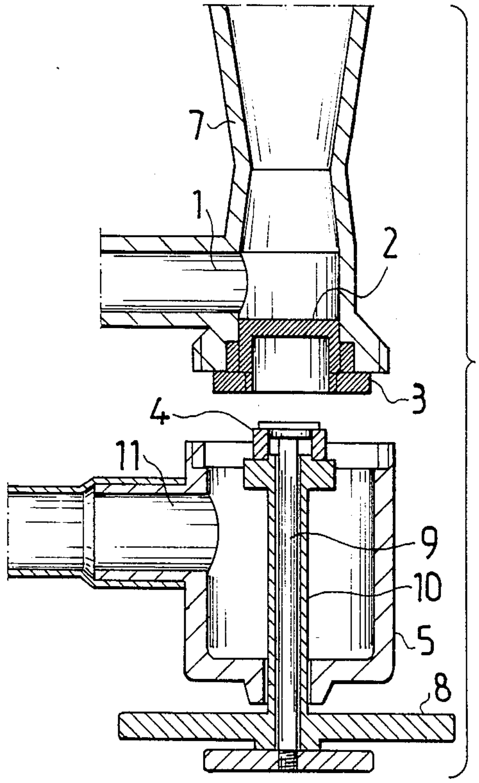
Fig.1
Fig.2
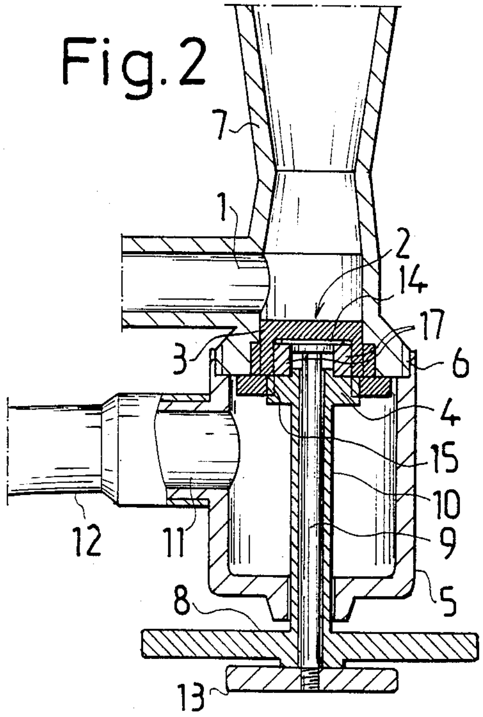
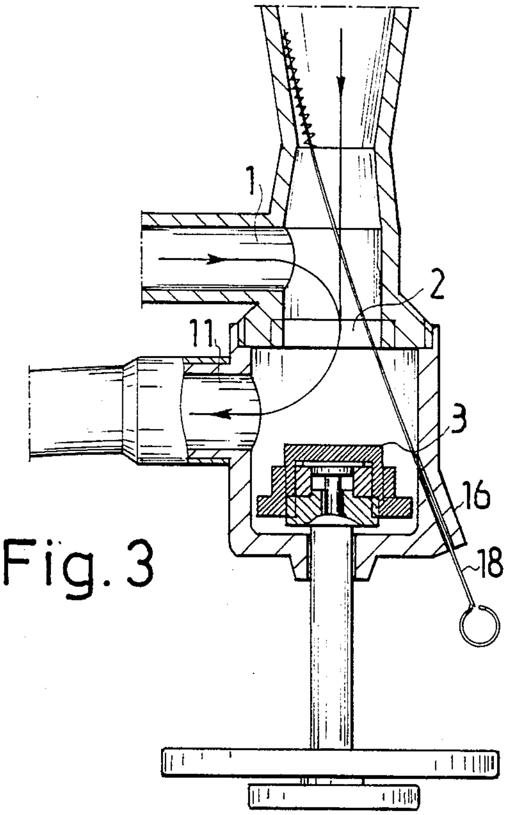
Fig.3

DEVICE FOR FLUSHING OBSTRUCTIONS FROM THE REJECT HEAD OF A CENTRIFUGAL SEPARATOR

This invention is designed to flush obstructions from the reject head of a centrifugal separator without interrupting normal operation.

Centrifugal separators (including hydro or liquid cyclones) are used mainly in the cellulose or paper industry for removing impurities, such as sand, bark, pieces of wood and metal particles etc., from pulp suspensions. The suspension to be purified is fed tangentially under pressure into the separator whereupon the mass starts to rotate. Centrifugal force separates particles of different weight or shape and forces them out to different positions in the vortex. Heavier substances, such as sand, go to the outermost position and move towards the the small-diameter exhaust pipe located at the apex of the separator cone. The purified pulp suspension, accept flow, leaves the separator through a co-axial discharge pipe at the accept end where the centre of the vacuum is formed inside the separator.

As the efficiency of centrifugal separators in removing small particles increases in proportion to the decreasing separator diameter, industry has moved over to small units.

One of the problems associated with modern small-diameter separators is the obstructing of the reject end. This is caused by over-sized particles or slowly accumulating deposits of impurities at the exhaust orifice. When the reject opening is blocked, filtering capacity is lost and impurities pass on into the accept flow and to the latter stages of the process.

Typical solutions to this problem vary. In older models, it was necessary to partly dismantle the separator in order to clean the exhaust orifice. Another method of tackling this problem is to use a reject orifice with variable diameter. Recent models permit the use of water or pressurized air for removing the blocking. One type of centrifugal separators is fitted with valves located at the exhaust orifice. These valves can be opened and used for cleaning. The Finnish patent application No. 801027 presents a combination of these two methods where a self-sealing valve is attached at the reject exhaust pipe. A needle-like nozzle spraying the pressurized medium is passed through the valve to clean the orifice.

The methods described above have certain disadvantages. In older models, the centrifugal separator must be dismantled therefore stopping the process. Newer methods involve the use of force or pressure to accomplish cleaning, and this can cause the impurities to be swept away with the accept flow and passed on to the accept mass. The valves are permanent fixtures and thus expensive because the reject ends of all the separators must be fitted with one.

This invention has none of the above mentioned disadvantages. It is characteristic of the invention that it comprises a chamber, open at one end, fitted with a opening device for removing the bottom plug of the discharge end, as well as a discharge orifice for removing the rejected matter from the centrifugal separator.

Moreover, the invention is characterized by the fact that it is a separate device which can be attached to the obstructed separator by means of a quick-locking mechanism such as a threaded joint.

Furthermore, the invention is characterized by the fact that the opening device consists of a sealed tube comprising an internal tightening rod fitted with grips for unscrewing and removing the plug; handles for operating the device are fitted at the opposite end.

Additionally, the invention is characterized by the fact that a tube or pipe can be attached to the discharge orifice of the chamber to remove the waste material or blocking sediment from the chamber when the plug is opened.

The invention is presented in detail with reference to the enclosed drawing where FIG. 1 depicts the opening device and the reject end of a centrifugal separator before they are attached to one another FIG. 2 shows the opening device ready for operation and attached to the reject end of the centrifugal separator FIG. 3 shows the condition after the bottom plug has been opened and the material causing the blockage is flushed out.

FIG. 1 shows the reject end (7) of the centrifugal separator comprising the reject outlet (1), cleaning orifice (2) and its plug (3). The opening device is composed of the frame or chamber (5), the opening device (8) for the plug and a discharge orifice (11). In addition, the opening end (4) forms a distinct unit comprising locking elements for the rod (9) and the tube (10) to be attached to the plug (3).

FIG. 2 shows the opening device attached to the centrifugal separator by means of a quick-locking mechanism (6). The splines (15) in the locking or opening end (4) lock the tube (10) to the separator plug (3) so that the plug (3) can be rotated in either direction. The force applied to the friction ring (17) by the handle (13) via the rod (9) and the flange (14) expands the opening end (4) against the plug (3) so that the plug will not drop off when removed.

FIG. 3 shows the plug (3) removed and the rejected material, indicated by an arrow, flowing from the reject orifice (2) and the impurities blocking the orifice (1) flowing out. A brush (18) and the opening for it (16) are also depicted in the figure.

The cleaning operation does not interfere with the operation of the centrifugal separator or the plant. Cleaning efficiency can be checked and improved by scraping the reject orifice mechanically or by repeating the opening procedure with the plug (3) while at the same time monitoring the quality of the mass flowing through the discharge orifices (1) and (11).

It is clear that the invention has several applications within the framework of the patent of claims presented below. Consequently, the exact construction of the extractor unit (9), (10) and (13) as well as that of the locking end (14), (15) and (17) may vary.

I claim:

1. In a centrifugal separator having an upwardly extending reject end with an open lower end, a removable plug closing the lower end of said reject end, a reject outlet located adjacent the lower end of said reject end, wherein the improvement comprises an opening device including a chamber having an upper end, a lower end and side walls laterally defining the chamber with the bottom end being closed and the upper end being open, a discharge orifice located in said side walls, a quick locking device located at the upper end of said chamber for removably securing said opening device to the lower end of said reject end, a tube positioned within said chamber extending through the bottom end of said chamber, said tube having an upper end located within said chamber and a lower end located exteriorly of said chamber, said tube being displaceable in said chamber, means on the upper end of said tube for locking said tube to said plug, a rod unit located within said tube and engageable with said plug for retaining said plug on said tube so that said tube and pipe can remove said plug from the lower end of said reject outlet whereby the chamber is in communication with the interior of said reject end through the open upper end of said chamber for receiving impurities blocking said reject outlet.

2. In a centrifugal separator, as set forth in claim 1, wherein the improvement further comprises said rod unit includes clamping means at the end thereof adjacent the upper end of said tube for engagement with said plug, and handle means located on the other end of said rod and accessible on the exterior of said chamber for manipulating said plug.

3. In a centrifugal separator, as set forth in claim 2, wherein the improvement further comprises said plug having an inner end facing into said reject end and an outer end located on the exterior of said reject end, said outer end of said plug being hollow, said plug being insertable into the hollow outer end of said plug, and said clamping means comprises a friction ring engageable with the inside of the hollow lower end of said plug.

* * * * *